US011718289B2

(12) United States Patent
Cheon

(10) Patent No.: US 11,718,289 B2
(45) Date of Patent: Aug. 8, 2023

(54) COLLISION AVOIDANCE DEVICE, VEHICLE HAVING THE SAME AND METHOD OF CONTROLLING THE VEHICLE

(71) Applicant: MANDO CORPORATION, Pyeongtaek-si (KR)

(72) Inventor: Seunghun Cheon, Seongnam-si (KR)

(73) Assignee: HL KLEMOVE CORP., Incheon (KR)

( * ) Notice: Subject to any disclaimer, the term of this patent is extended or adjusted under 35 U.S.C. 154(b) by 479 days.

(21) Appl. No.: 16/735,107

(22) Filed: Jan. 6, 2020

(65) Prior Publication Data

US 2020/0369264 A1 Nov. 26, 2020

(30) Foreign Application Priority Data

May 21, 2019 (KR) .......................... 10-2019-0059638

(51) Int. Cl.
*B60W 30/09* (2012.01)
*B60W 30/095* (2012.01)
(Continued)

(52) U.S. Cl.
CPC .......... *B60W 30/09* (2013.01); *B60K 31/0008* (2013.01); *B60R 21/0134* (2013.01);
(Continued)

(58) Field of Classification Search
CPC ............ B60W 30/09; B60W 30/0953; B60W 2552/50; B60W 2420/52; B60W 2520/10;
(Continued)

(56) References Cited

U.S. PATENT DOCUMENTS 6,269,307 B1 * 7/2001 Shinmura ............. G01S 13/931
340/436
6,859,731 B2 * 2/2005 Takafuji ................ B60W 10/18
342/72
(Continued)

FOREIGN PATENT DOCUMENTS

CN 104210489 A * 12/2014 ............ B60W 10/18
EP 1470967 A1 * 10/2004 ................ B60T 7/22
(Continued)

OTHER PUBLICATIONS

Machine translation of JP2009214832A (Year: 2022).*
(Continued)

*Primary Examiner* — Isaac G Smith
*Assistant Examiner* — Jennifer M Anda
(74) *Attorney, Agent, or Firm* — Morgan, Lewis & Bockius LLP

(57) ABSTRACT

A vehicle acquires position information of the obstacle, identifies a collision point that may collide with the obstacle based on the acquired position information of the obstacle, controls one of steering and braking based on the position information of the identified collision point, and when controlling the steering, acquires a collision avoidance margin distance value corresponding to the position information of the identified collision point, predicts the collision position based on the position information of the obstacle and the information detected by the velocity detector, acquires a distance value between the predicted collision position and the current position, acquires a lateral movement distance value based on the acquired distance value and a preset turning radius of the vehicle, acquires a steering angle based on the acquired lateral movement distance value and the acquired collision avoidance margin distance value and controls steering based on the acquired steering angle.

15 Claims, 12 Drawing Sheets

(51) Int. Cl.
  *B60K 31/00* (2006.01)
  *B60R 21/0134* (2006.01)
  *G01S 13/931* (2020.01)

(52) U.S. Cl.
  CPC ....... *B60W 30/0953* (2013.01); *G01S 13/931* (2013.01); *B60K 2031/0016* (2013.01); *B60K 2031/0033* (2013.01)

(58) Field of Classification Search
  CPC ... B60W 2520/105; B60W 2554/4026; B60W 2554/4029; B60W 2554/4041; B60W 2554/4044; B60W 2754/20; B60W 10/184; B60W 10/20; B60W 40/105; B60W 40/107; B60W 2530/18; B60W 2540/18; B60K 31/0008; B60K 2031/0016; B60K 2031/0033; B60R 21/0134; G01S 13/931; G01S 13/867; G01S 13/87; G01S 2013/9318; G01S 2013/93185; G01S 2013/932; G01S 2013/93271; G01S 2013/93272; G01S 2013/93274
  See application file for complete search history.

(56) References Cited

U.S. PATENT DOCUMENTS

| | | | |
|---|---|---|---|
| 10,293,819 B1 * | 5/2019 | El-Khatib | B60W 60/001 |
| 2017/0057498 A1 * | 3/2017 | Katoh | B60W 40/105 |
| 2018/0178783 A1 * | 6/2018 | Saiki | G08G 1/165 |
| 2018/0361973 A1 * | 12/2018 | Harada | B60R 21/0134 |

FOREIGN PATENT DOCUMENTS

| | | | |
|---|---|---|---|
| FR | 2905334 A1 * | 3/2008 | ............ B60W 10/20 |
| JP | 2006099715 A | 4/2006 | |
| JP | 2009214832 A | 9/2009 | |
| JP | 6407626 B2 | 9/2018 | |
| JP | 2019026056 A | 2/2019 | |
| KR | 10-1868088 B1 | 7/2018 | |
| KR | 20180113553 A | 10/2018 | |

OTHER PUBLICATIONS

Machine translation of KR101868088B1 (Year: 2022).*
Machine translation of FR-2905334-A1 (Year: 2023).*
Machine translation of CN-104210489-A (Year: 2023).*
Office Action issued in Korean Patent Application No. 10-2019-0059638 dated Apr. 11, 2020.

* cited by examiner (a)

(b)

COLLISION AVOIDANCE DEVICE, VEHICLE HAVING THE SAME AND METHOD OF CONTROLLING THE VEHICLE

CROSS-REFERENCE TO RELATED APPLICATION

This application is based on and claims priority under 35 U.S.C. § 119 to Korean Patent Application No. 10-2019-0059638, filed on May 21, 2019 in the Korean Intellectual Property Office, the disclosure of which is incorporated herein by reference.

BACKGROUND

1. Field

The present disclosure relates to a collision avoidance device for detecting an obstacle and preventing a collision with the detected obstacle, a vehicle having the same, and a method of controlling the vehicle.

2. Description of the Related Art

A vehicle is a machine that travels by driving wheels and transports people or cargo while moving on a road. Such a vehicle may have an accident due to failure of the vehicle, driver's carelessness, an error of another vehicle, or road condition.

Recently, there have been development on various types of advanced driver assistance system (ADAS) that are designed to inform a driver of travelling information of a vehicle to prevent an accident from occurring due to driver's carelessness and perform autonomous driving for driver's convenience.

One example of the ADAS is a technology for detecting an obstacle around a vehicle by installing a distance sensor on the vehicle and warning the driver of the obstacle. With this technology, accidents are prevented in advance.

Another example of the ADAS is a technology in which the distance to another vehicle is obtained through an electromagnet mounted on a bumper of a vehicle, and if the distance to the other vehicle is within a certain distance, the situation is determined to be a collision situation and power is supplied to the electromagnet to generate a magnetic force that allows the vehicle to be automatically braked in the collision situation.

As such, at the time of warning of the collision, collision avoidance may be impossible due to immature driving or a driver's judgment error. In addition, at the time of automatic braking for collision avoidance, it may also be impossible to steer the vehicle to enter a safe state due to immature driving or a driver's judgment error. This caused the vehicle to move in an undesired direction causing a danger.

SUMMARY

Therefore, it is an object of the present disclosure to provide a collision avoidance device for acquiring a collision position and performing steering and braking based on the acquired collision position, a vehicle having the same, and a method of controlling the vehicle.

It is another object of the present disclosure to provide a collision avoidance device for acquiring a movement direction of an obstacle and performing steering and braking based on the acquired movement direction when the collision position is the center, a vehicle having the same, and a method of controlling the vehicle.

In accordance with one aspect of the present disclosure, a collision avoidance device include: an obstacle detector configured to detect an obstacle; and a controller configured to acquire a position information of the obstacle based on the obstacle information detected by the obstacle detector, identify a collision point that may collide with the obstacle based on the acquired position information of the obstacle, generate a control signal for controlling at least one of steering and braking based on the position information of the identified collision point and transmit the generated control signal to at least one of a steering system and a braking system.

The controller is configured to predict collision position, acquire a distance value between the predicted collision position and the current position, acquire a movement distance value in the lateral direction based on the acquired distance value and a preset turning radius of the vehicle, acquire a steering angle based on the acquired movement distance value in the lateral direction and generate a steering signal based on the acquired steering angle.

The controller is configured to acquire a collision avoidance margin distance value based on the distance value between the identified collision point and the reference collision point and acquire a steering angle based on the acquired collision avoidance margin distance value and the acquired movement distance value in the lateral direction.

The collision avoidance device further includes: a storage configured to store a collision avoidance margin distance value corresponding to each of the plurality of collision points, the controller is further configured to identify a collision avoidance margin distance value corresponding to the identified collision point, acquire a total movement distance value in the lateral direction based on the identified collision avoidance margin distance value and the acquired movement distance value in the lateral direction and acquire a steering angle based on the acquired total movement distance value.

The obstacle detector includes a radar having an angular resolution in the lateral direction, wherein the controller is configured to acquire a direction and a distance value of the obstacle as position information of the obstacle based on radar data received through at least one of a plurality of reception channels corresponding to the angular resolution in the lateral direction.

The collision avoidance device further includes: a velocity detector, wherein the controller is further configured to acquire velocity of the obstacle, acceleration of the obstacle and distance to which the obstacle will move based on a change of distance value from the obstacle according to a change of time, acquire a travelling velocity, a velocity of the vehicle, an acceleration of the vehicle, and a distance value to which the vehicle will move based on the information detected by the velocity detector, predict a collision position based on the velocity of the vehicle, the acceleration of the vehicle and the distance value to which the vehicle will move, and the velocity of the obstacle, the acceleration of the obstacle and the distance value to which the obstacle will move;

The controller is configured to generate a steering signal in a clockwise direction when a collision point that may collide with the obstacle is left side, and generate a steering signal in a counterclockwise direction when a collision point that may collide with the obstacle is a right side.

The collision avoidance device further includes: a velocity detector configured to detect traveling velocity, wherein the controller is configured to identify a traveling velocity when the collision point that may collide with the obstacle is the center collision point, generate an emergency braking signal when the identified traveling velocity is less than or equal to a reference velocity and generate a steering signal in the same direction as the movement direction of the obstacle when the identified traveling velocity exceeds the reference velocity.

In accordance with one aspect of the present disclosure, a vehicle includes: an obstacle detector configured to detect an obstacle; a collision avoidance device configured to acquire a position information of the obstacle based on the obstacle information detected by the obstacle detector, identify a collision point that may collide with the obstacle based on the acquired position information of the obstacle, generate a control signal for controlling at least one of steering and braking based on the position information of the identified collision point; a steering system configured to perform the steering based on the steering signal generated by the collision avoidance device; and a braking system configured to perform braking based on the braking signal generated by the collision avoidance device.

The vehicle further includes: a velocity detector, wherein the collision avoidance device is configured to predict collision position based on the position information of the obstacle and the information detected by the velocity detector, acquire a distance value between the predicted collision position and the current position, acquire a movement distance value in the lateral direction based on the acquired distance value and a preset turning radius of the vehicle, acquire a steering angle based on the acquired movement distance value in the lateral direction and generate a steering signal based on the acquired steering angle.

The collision avoidance device is configured to acquire a collision avoidance margin distance value based on the distance value between the identified collision point and the reference collision point and acquire the steering angle by adding the acquired collision avoidance margin distance value to the acquired movement distance value in the lateral direction when acquiring the steering angle.

The vehicle further includes: a storage configured to store a collision avoidance margin distance value corresponding to each of the plurality of collision points, wherein the collision avoidance device is configured to identify a collision avoidance margin distance value corresponding to the identified collision point and acquire the steering angle by adding the acquired collision avoidance margin distance value to the acquired movement distance value in the lateral direction when acquiring the steering angle.

The vehicle further includes: a storage configured to store a reference additional distance value corresponding to a reference collision point among a plurality of collision points and a distance value between the remaining collision point among the plurality of collision points and the reference collision point, wherein the collision avoidance device is configured to acquire a reference additional distance value as a collision avoidance margin distance value when the identified collision point is the reference collision point, identify a distance value between the identified collision point and the reference collision point when the identified collision point is not the reference collision point, acquire a sum of the identified distance value and the reference additional distance value as a collision avoidance margin distance value and acquire the steering angle by adding the acquired collision avoidance margin distance value to the acquired movement distance value in the lateral direction when acquiring the steering angle.

The obstacle detector includes a radar having an angular resolution in the lateral direction, wherein the collision avoidance device is configured to acquire a direction and a distance value of the obstacle as position information of the obstacle based on radar data received through at least one of a plurality of reception channels corresponding to the angular resolution in the lateral direction.

The collision avoidance device is configured to generate a steering signal in a clockwise direction when a collision point that may collide with the obstacle is left side, and generate a steering signal in a counterclockwise direction when a collision point that may collide with the obstacle is a right side.

The vehicle further includes: a velocity detector configured to detect traveling velocity, wherein the collision avoidance device is configured to identify a traveling velocity when the collision point that may collide with the obstacle is the center collision point, generate an emergency braking signal when the identified traveling velocity is less than or equal to a reference velocity and generate a steering signal in the same direction as the movement direction of the obstacle when the identified traveling velocity exceeds the reference velocity.

The vehicle further includes: a camera; wherein the collision avoidance device is configured to acquire a target point of the obstacle based on the image information of the camera and identify a collision point that may collide with the acquired target point when identifying the collision point that may collide with the obstacle.

In accordance with one aspect of the present disclosure, a method of controlling a vehicle includes: acquiring a direction and a distance value of the obstacle as position information of the obstacle based on radar data received through at least one of a plurality of reception channels corresponding to the angular resolution in the lateral direction of an obstacle detector; identifying a collision point that may collide with the obstacle based on the acquired position information of the obstacle; controlling at least one of steering and braking based on the position information of the identified collision point; and when controlling the steering, acquiring a collision avoidance margin distance value corresponding to the position information of the identified collision point, predicting the collision position based on the position information of the obstacle and the information detected by the velocity detector, acquiring a distance value between the predicted collision position and the current position, acquiring a movement distance value in the lateral direction based on the acquired distance value and a preset turning radius of the vehicle, acquiring a steering angle based on the acquired movement distance value in the lateral direction and the acquired collision avoidance margin distance value and controlling steering based on the acquired steering angle.

The acquiring a collision avoidance margin distance value corresponding to the position information of the identified collision point includes: acquiring a reference additional distance value as a collision avoidance margin distance value when the identified collision point is the reference collision point; identifying a distance value between the identified collision point and the reference collision point when the identified collision point is not the reference collision point; and acquiring a sum of the identified distance value and the reference additional distance value as a collision avoidance margin distance value.

The controlling at least one of steering and braking includes: identifying a traveling velocity when the identified collision point is the center collision point, controlling an emergency braking when the identified traveling velocity is less than or equal to a reference velocity and controlling a steering in the same direction as the movement direction of the obstacle when the identified traveling velocity exceeds the reference velocity; controlling the steering and braking in a clockwise direction when a collision point that may collide with the obstacle is left side; and controlling the steering and braking in a counterclockwise direction when a collision point that may collide with the obstacle is a right side.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
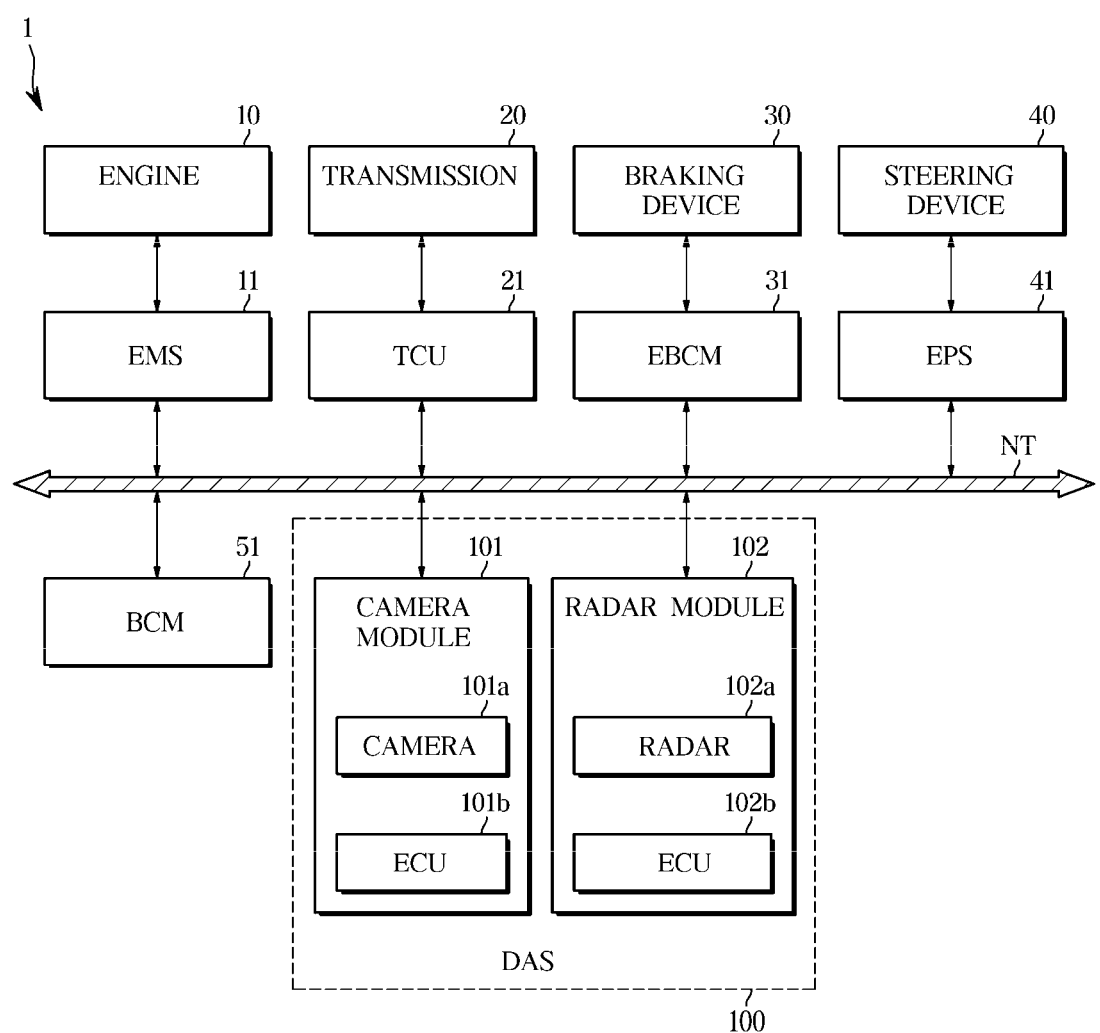
FIG. 1 is a block diagram illustrating a vehicle according to an embodiment.

Like numerals refer to like elements throughout the specification. Not all elements of embodiments of the present disclosure will be described, and description of what are commonly known in the art or what overlap each other in the embodiments will be omitted.

The terms as used throughout the specification, such as "~part", "~module", "~member", "~block", etc., may be implemented in software and/or hardware, and a plurality of "~parts", "~modules", "~members", or "~blocks" may be implemented in a single element, or a single "~part", "~module", "~member", or "~block" may include a plurality of elements.

It will be further understood that the term "connect" or its derivatives refer both to direct and indirect connection, and the indirect connection includes a connection over a wireless communication network.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof, unless the context clearly indicates otherwise.

In the specification, it should be understood that, when a member is referred to as being "on/under" another member, it can be directly on/under the other member, or one or more intervening members may also be present.

Although the terms "first," "second," "A," "B," etc. may be used to describe various components, the terms do not limit the corresponding components, but are used only for the purpose of distinguishing one component from another component.

As used herein, the singular forms "a," "an" and "the" are intended to include the plural forms as well, unless the context clearly indicates otherwise.

Reference numerals used for method steps are just used for convenience of explanation, but not to limit an order of the steps. Thus, unless the context clearly dictates otherwise, the written order may be practiced otherwise.

Hereinafter, the operating principles and embodiments of the present disclosure will be described with reference to the accompanying drawings.

FIG. 1 is a block diagram illustrating a vehicle according to an embodiment.

The vehicle according to the embodiment may refer to a vehicle traveling in response to driver's driving intent, or may refer to an autonomous vehicle that autonomously travels to a destination.

Referring to FIG. 1, the vehicle 1 includes an engine 10, a transmission 20, a braking device 30, and a steering device 40.

The engine 10 may include a cylinder and a piston, and generate power for the vehicle 1 to travel.

The transmission 20 may include a plurality of gears, and transmit power generated by the engine 10 to wheels.

The braking device 30 may decelerate the vehicle 1 or stop the vehicle 1 through friction with the wheels.

The steering device 40 may change the travelling direction of the vehicle 1.

The vehicle 1 may include a plurality of electrical components.

For example, the vehicle 1 further includes an engine management system (EMS) 11, a transmission control unit (TCU) 21, and an electronic brake control module (EBCM) 31), an electronic power steering (EPS) 41, a body control module (BCM), and an advanced driver assistance system (ADAS).

The EMS 11 may control the engine 10 in response to acceleration intent of a driver through an accelerator pedal or a request of an advanced driver assistance system (ADAS) 100. For example, the EMS 11 may control the torque of the engine 10.

The TCU 21 may control the transmission 20 in response to a shift command of the driver through a shift lever and/or a travelling velocity of the vehicle 1. For example, the TCU 21 may adjust the gear ratio from the engine 10 to the vehicle wheels.

The EBCM 31 may control the braking device 30 in response to a braking intent of a driver through a braking pedal and/or a slip of the vehicle wheels. For example, the EBCM 31 may temporarily release the braking of the vehicle wheel in response to a slip of the vehicle wheel sensed at a time of braking of the vehicle 1 (anti—lock braking systems, ABS).

The EBCM 31 may selectively release braking of the vehicle wheel in response to over—steering and/or under—steering sensed at a time of steering of the vehicle 1 (electronic stability control, ESC).

In addition, the EBCM 31 may temporarily brake the vehicle wheels in response to a slip of the vehicle wheel sensed at a time of driving of the vehicle 1 (traction control system, TCS).

The EPS 41 may assist the operation of the steering device 40 so that the driver easily manipulates the steering wheel, in response to a steering intent of the driver through the steering wheel. For example, the EPS 41 may assist the operation of the steering device 40 such that the steering force is reduced during low—velocity traveling or parking and is increased during high—velocity traveling.

The BCM 51 may control the operation of the electronic components that provide convenience to the driver or ensure the safety of the driver. For example, the BCM 51 may control a head lamp, a wiper, a cluster, a multifunction switch, a turn signal lamp, and the like.

The ADAS 100 may assist the driver in manipulating (driving, braking, steering) the vehicle 1. For example, the ADAS 100 may detect a surrounding environment (e.g., another vehicle, a pedestrian, a cyclist, a lane, a road sign, etc.) around the vehicle 1 and control the driving and/or braking and/or steering of the vehicle 1 in response to the sensed surrounding environment.

The ADAS 100 may provide the driver with various functions. For example, the DAS 60 may provide a lane departure warning (LDW), a lane keeping assist (LKA), a high beam assist (HBA), an autonomous emergency braking (AEB), a traffic sign recognition (TSR), a smart cruise control (SCC), a blind spot detection (BSD), and the like.

The ADAS 100 may include a collision avoidance device for outputting notification information about collision with an obstacle or for avoiding the obstacle, to prevent collision the obstacle.

The ADAS 100 may include a camera module 101 for acquiring image data around the vehicle 1 and a radar module 102 for acquiring obstacle data around the vehicle 1.

The camera module 101 may include a camera 101*a* and an electronic control unit (ECU) 101*b*, and may photograph the front of the vehicle 1 and recognize other vehicles, pedestrians, cyclists, lanes, road signs, and the like.

The radar module 102 may include a radar 102*a* and an electronic control unit (ECU) 102*b* and may acquire relative positions and relative velocities of obstacles (e.g., other vehicles, pedestrians, cyclists, and the like) around the vehicle 1.

The above described electronic components may communicate with each other through vehicle communication network (NT). For example, the electrical components may exchange data therebetween through Ethernet, media oriented systems transport (MOST), Flexray, controller area network (CAN), local interconnect network (LIN), and the like.

The ADAS 100 may transmit a driving control signal, a braking signal, and a steering signal to the EMS 11, the EBCM 31, and the EPS 41, respectively, through the NT.

Figure 2:
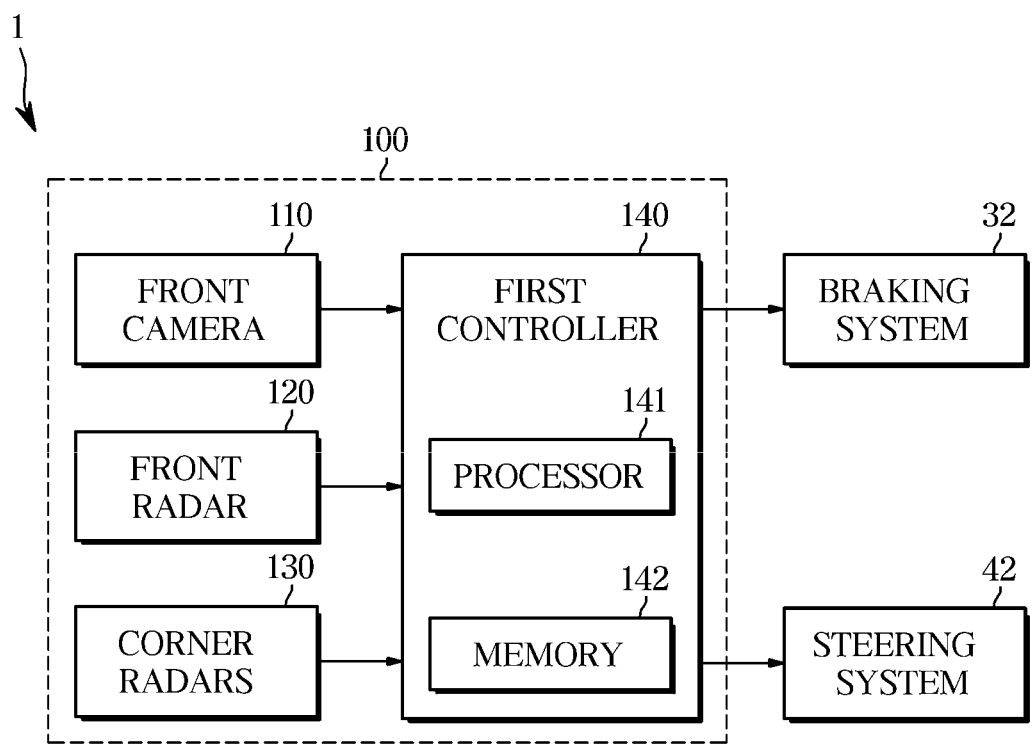
FIG. 2 is a block diagram illustrating an advanced driver assistance system (ADAS) provided in a vehicle according to an embodiment.
Figure 3:
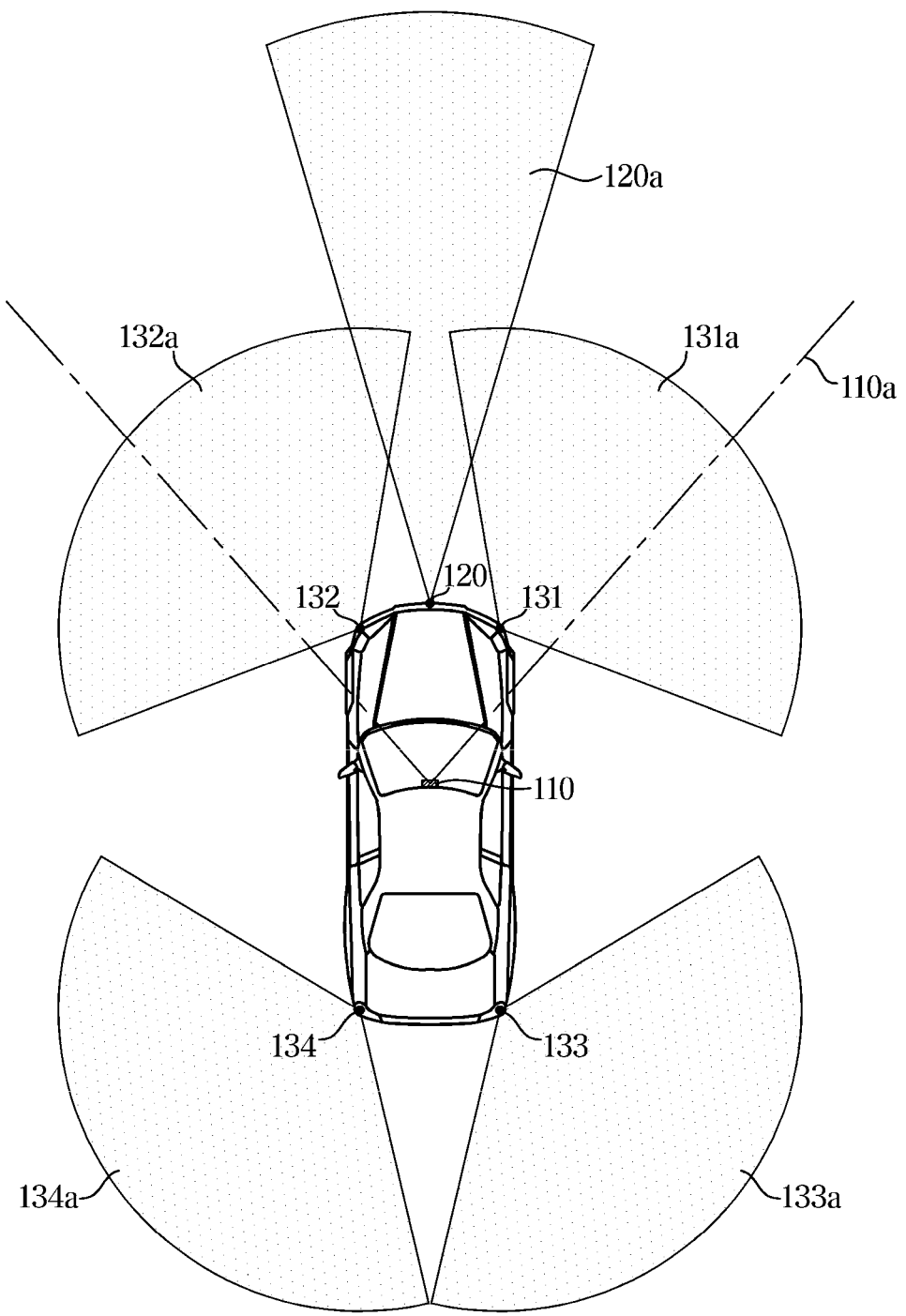
FIG. 3 is a diagram illustrating an example of a detection area of a camera and a radar included in an ADAS of a vehicle according to an embodiment.

FIG. 2 is a block diagram illustrating an ADAS provided in a vehicle according to an embodiment, and FIG. 3 is a diagram illustrating an example of a detection area of a camera and a radar included in an ADAS of a vehicle according to an embodiment.

The DAS according to the embodiment may perform a collision avoidance function for preventing a collision with an obstacle. That is, the ADAS according to the present embodiment may represent a collision avoidance device.

Referring to FIG. 2, the vehicle 1 may include a braking system 32, a steering system 42, and a ADAS 100.

The braking system 32 according to the embodiment may include the EBCM (31 in FIG. 1) and the braking device (30 in FIG. 1) described in conjunction with FIG. 1, and the steering system 42 may include the EPS (41 in FIG. 1) and the steering device (40 in FIG. 1).

The ADAS 100 according to the embodiment may include a front camera 110 as a camera of the camera module 101, and may include a plurality of corner radars (130: 131, 132, 133, and 134) as the radar of the radar module 102.

Referring to FIG. 3, the ADAS 100 may include the front camera 110 configured to have a field of view 110*a* directed to the front of the vehicle 1, a front radar 120, and the plurality of corner radars 130.

The front camera 110 may be installed on a front windshield of the vehicle 1.

The front camera 110 may photograph the front of the vehicle 1 and acquire image data regarding the front of the vehicle 1. The image data regarding the front of the vehicle 1 may include position information of at least one of another vehicle, a pedestrian, a cyclist, a lane, a curb, a guard rail, a roadside tree, a street lamp, or the like existing in front of the vehicle 1.

The front camera 110 may include a plurality of lenses and an image sensor. The image sensor may include a plurality of photodiodes for converting light into electrical signals, and the plurality of photodiodes may be arranged in a two—dimensional matrix.

The front camera 110 may be electrically connected to a first controller 140. For example, the front camera 110 may be connected to the first controller 140 through a vehicle communication network NT, through a hard wire, or through a printed circuit board (PCB).

The front camera 110 may transmit the image data of the front of the vehicle 1 to the first controller 140.

The front radar 120 may have a field of sensing 120*a* directed to the front of the vehicle 1. The front radar 120 may be installed, for example, on a grille or a bumper of the vehicle 1.

The front radar 120 may include a transmission antenna (or a transmission antenna array) that radiates transmission radio waves to the front of the vehicle 1 and a reception antenna (or a reception antenna array) that receives reflection radio waves reflected from an obstacle.

The front radar 120 may acquire front radar data from the transmission radio waves transmitted by the transmission antenna and the reflection radio waves received by the reception antenna.

Front radar data may include position information and velocity information regarding an obstacle, such as another vehicle, a pedestrian, or a cyclist existing in front of the vehicle 1.

The front radar 120 may calculate the relative distance to the obstacle based on the phase difference (or time difference) between the transmission radio waves and the reflection radio waves, and calculate the relative velocity of the object based on the frequency difference between the transmission radio waves and the reflected radio waves.

The front radar 120 may be connected to the first controller 140 through a vehicle communication network NT, a hard wire, or a printed circuit board. The front radar 120 may transmit the front radar data to the first controller 140.

The plurality of corner radars 130 includes a first corner radar 131 installed on the front right side of the vehicle 1, a second corner radar 132 installed on the front left side of the vehicle 1, a third corner radar 133 installed on the rear right side of the vehicle 1, and a fourth corner radar 134 installed on the rear left side of the vehicle 1.

The first corner radar 131 may have a field of sensing 131a directed to the front right side of the vehicle 1. The first corner radar 131 may be installed on the right side of a front bumper of the vehicle 1.

The second corner radar 132 may have a field of sensing 132a directed to the front left side of the vehicle 1, and may be installed on the left side of the front bumper of the vehicle 1.

The third corner radar 133 may have a field of sensing 133a directed to the rear right side of the vehicle 1 and may be installed on the right side of a rear bumper of the vehicle 1.

The fourth corner radar 134 may have a field of sensing 134a directed to the rear left side of the vehicle 1 and may be installed on the left side of the rear bumper of the vehicle 1.

Each of the first, second, third and fourth corner radars 131, 132, 133, and 134 may include a transmission antenna and a reception antenna.

The first, second, third, and fourth corner radars 131, 132, 133 and 134 acquire first corner radar data, second corner radar data, third corner radar data, and fourth corner radar data, respectively.

The first corner radar data may include distance information and velocity information regarding another vehicle, a pedestrian or a cyclist (hereinafter, referred to as "an obstacle") existing on the front right side of the vehicle 1.

The second corner radar data may include distance information and velocity information regarding an obstacle existing on the front left side of the vehicle 1.

The third and fourth corner radar data may respectively include distance and velocity information regarding an obstacle existing on the rear right side of the vehicle 1 and distance and velocity information regarding an object located on the rear left side of the vehicle 1, respectively.

Each of the first, second, third, and fourth corner radars 131, 132, 133 and 134 may be connected to the first controller 140, for example, through a vehicle communication network NT, a hard wire, or a printed circuit board. The first, second, third, and fourth corner radars 131, 132, 133, and 134 may respectively transmit the first corner radar data, the second corner radar data, the third corner radar data, and the fourth corner radar data to the first controller 140.

The first controller 140 may include the ECU (101b in FIG. 1) of the camera module (101 in FIG. 1) and/or the ECU (102b in FIG. 1) of the radar module (102 in FIG. 1), and/or an integrated ECU.

The first controller 140 includes a processor 141 and a memory 142.

The processor 141 may process the front image data of the front camera 110, the front radar data of the front radar 120, and the corner radar data of the plurality of corner radars 130, and generate a braking signal and a steering signal for controlling the braking system 32 and the steering system 42.

For example, the processor 141 may include an image signal processor for processing the front image data of the front camera 110 and/or a digital signal processor for processing radar data of the radars 120 and 130 and/or a micro control unit (MCU) for generating a braking signal and/or a steering signal.

The processor 141 may detect obstacles (e.g., another vehicle, a pedestrian, a cyclist, a curb, a guard rail, a roadside tree, a street lamp, and the like) in front of the vehicle 1 based on the front image data of the front camera 110 and the front radar data of the radar 120.

In detail, the processor 141 may acquire position information (distance and direction) and velocity information (relative velocity) of the obstacles in front of the vehicle 1 based on the front radar data of the front radar 120. The processor 141 may acquire position information (direction) and type information (for example, whether the obstacle is another vehicle, a pedestrian, a cyclist, a cub, a guard rail, a roadside tree, a street lamp, or the like) of the obstacle existing in front of the vehicle 1 based on the front image data of the front camera 110.

In addition, the processor 141 may match the obstacles detected by the front image data with the obstacles detected by the front radar data, and acquire the type information, the position information, and the velocity information of the obstacles in front of the vehicle 1 based on a result of the matching.

The processor 141 may generate a braking signal and a steering signal based on the type information, the position information, and the velocity information of the front obstacles.

For example, the processor 141 calculates a time to collision (TTC) between the vehicle 1 and the front obstacle based on the position information (relative distance) and the velocity information (relative velocity) of the front objects, and warns the driver of a collision, transmits a braking signal to the braking system 32, or transmits a steering signal to the steering system 42 based on a result of comparing the TTC with a predetermined reference time.

In response to the TTC less than a predetermined first reference time, the processor 141 may allow an alert to be output via audio and/or display.

In response to the TTC less than a predetermined second reference time, the processor 141 may transmit a preliminary—braking signal to the braking system 32.

In response to the TTC less than a predetermined third reference time, the processor 141 may transmit an emergency braking signal to the braking system 32. In this case, the second reference time is shorter than the first reference time, and the third reference time is shorter than the second reference time.

The processor 141 may transmit a steering signal to the steering system 42 based on the direction information of the position information of the front obstacles.

As another example, the processor 141 may calculate a distance to collision (DTC) based on the velocity information (relative velocity) of front objects, and warn the driver of a collision or transmit a braking signal to the braking system 32 based on a result of comparing the DTC with distances to the front objects.

The processor 141 may acquire position information (distance and direction) and velocity information (relative velocity) of the obstacles on the sides of the vehicle 1 (front right, front left, rear right, and rear left) based on corner radar data of the plurality of corner radars 130.

The memory 142 may store programs and/or data for processing image data by the processor 141, programs and/or data for processing radar data by the processor 141, and programs and/or data for generating a braking signal and/or a steering signal by the processor 141.

The memory 142 may temporarily memorize the image data received from the front camera 110 and/or the radar data received from the radars 120 and 130, and may temporarily memorize a result of processing the image data and/or the radar data of the processor 141.

The memory 142 may not only include a volatile memory, such as an S-RAM, a D-RAM, and the like, but also include a non-volatile memory, such as a flash memory, a read only memory (ROM), an erasable programmable read only memory (EPROM), and the like.

Figure 4:
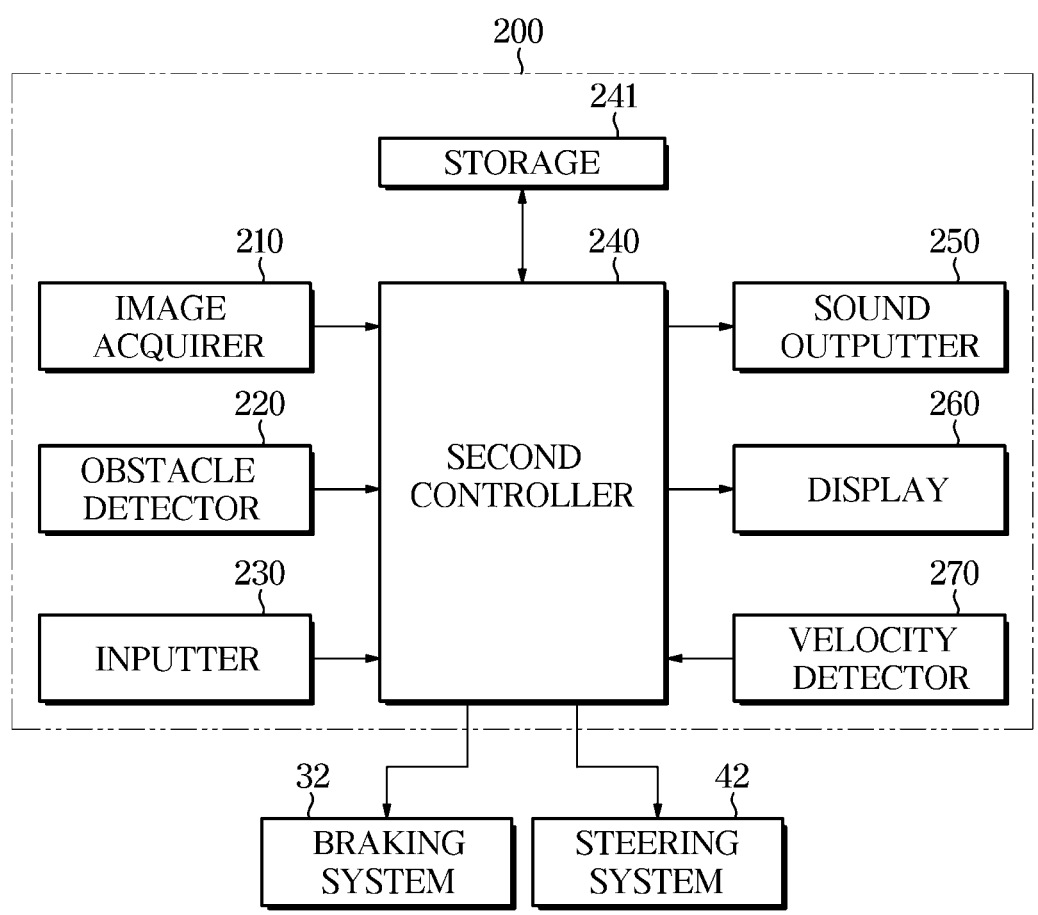
FIG. 4 is a block diagram illustrating the collision avoidance device of the ADAS 100 provided in a vehicle according to an embodiment.

FIG. 4 is a block diagram illustrating the collision avoidance device of the ADAS 100 provided in a vehicle according to an embodiment.

The collision avoidance device provided in a vehicle 1 may include an image acquirer 210, an obstacle detector 220, an inputter 230, a second controller 240, a storage 241, a sound outputter 250, and a display 260, and may further include the braking system 32 and the steering system 42.

The image acquirer 210 acquires an image of a road and transmits information about the acquired image to the second controller 240. The information about the image may be image data.

The image acquirer 210 may include the front camera 110, and may acquire image information of the road and acquire the shape of an obstacle from front image data photographed by the front camera 110. The shape of the obstacle may refer to information for recognizing the type of the obstacle. In addition, position information and velocity information of the obstacle may be also acquired from the image data photographed by the front camera.

The obstacle detector 220 detects obstacles on the front side and the left and right sides of a host vehicle, and transmits obstacle information about the detected obstacles to the second controller 240. The obstacle information may include position information of the obstacle, and the position information of the obstacle may include a distance to the obstacle and a direction of the obstacle.

The obstacle detector 220 may include the front radar 120 and the first and second corner radars 131 and 132.

The front radar 120 and the first and second corner radars 131 and 132 are low-cost radars that are less expensive than the lidar sensors, and may be radars of the model MRR-20, the model LRR-20, or the model LRR-30.

The front radar 120 and the first and second corner radars 131 and 132 may be radars of the same model or may be radars of different models.

In addition, the front radar 120 may be a radar having a higher angular resolution than the first and second corner radars 131 and 132.

Figure 5:
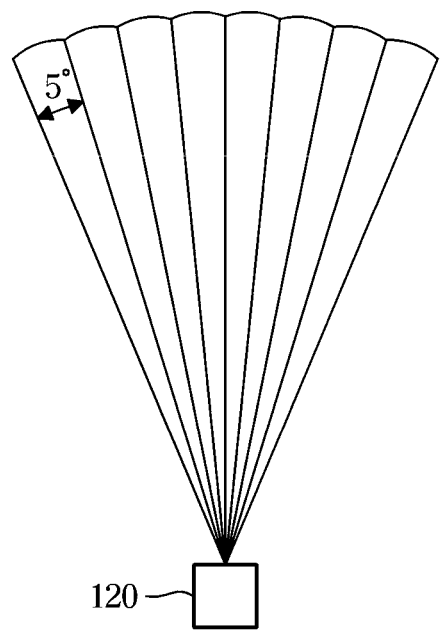
FIG. 5 is an exemplary diagram of angular resolution in the lateral direction of an obstacle detector in a collision avoidance device provided in a vehicle according to an embodiment.
Figure 5:
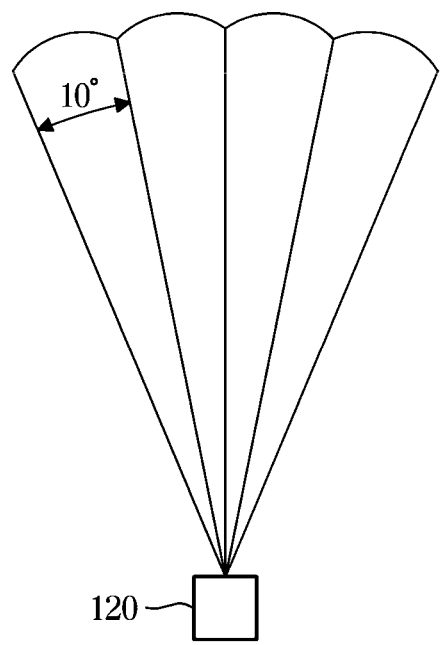

As shown in FIG. 5A, when the obstacle detector is a radar of the model LRR-20, the obstacle detector may detect the position of the obstacle existing at a distance of 200 m or more through eight reception channels having a lateral angle resolution of 5 degrees or less.

That is, the obstacle detector may detect the exact direction of the obstacle through the eight reception channels.

In addition, when the obstacle detector is a radar of the model LRR-30, the obstacle detector may have a lateral angle resolution of 2.5 degrees or less.

As shown in FIG. 5B, when the obstacle detector is the radar of the model MRR-20, the obstacle detector may detect the position of the obstacle existing at a distance of about 160 m through four reception channels having a lateral angle resolution of 10 degrees or less.

Here, the lateral direction may be a direction perpendicular to the moving direction of the vehicle.

The obstacle detector 220 for controlling the braking system and the steering system to prevent the collision with the obstacle may include only the front radar 120. In this case, the front radar 120 may have a plurality of reception channels, and may output position information of the obstacle corresponding to the detection signal of the obstacle received through at least one reception channel among the plurality of reception channels.

Here, the plurality of reception channels may receive radio waves reflected by obstacles in respective regions divided at predetermined angles with the center of the front of the vehicle as the center.

That is, the obstacle detector 220 may detect the direction of the obstacle through a reception channel in which an obstacle is detected among a plurality of reception channels having a predetermined angle resolution.

When the first and second corner radars 131 and 132 control steering to prevent a collision, the first and second corner radars 131 and 132 detect an obstacle on the left or right side of the host vehicle to determine whether there is an additional collision on the left or right side of the host vehicle.

In addition, the obstacle detector 220 may include a LiDAR sensor.

A light detection and ranging (LiDAR) sensor is a non—contact distance detection sensor using the laser radar principle.

The LiDAR sensor may include a transmitter for transmitting a laser and a receiver for receiving a laser, which is reflected from a surface of an object existing within a sensor range and then is returned.

The laser may be a single laser pulse.

For reference, since the LiDAR sensor has a higher accuracy in lateral direction detection when compared to a radar detecting and ranging (RaDAR) sensor, the use of the LiDAR sense may increase the accuracy of determining whether a passage exists in the front area.

The obstacle detector 220 may include an ultrasonic sensor.

The ultrasonic sensor generates ultrasonic waves for a predetermined period of time and detects a signal, which is reflected by an object and then is returned. Such an ultrasonic sensor may be used to determine the presence or absence of an obstacle, such as a pedestrian, in a short range.

The inputter 230 may receive an on—off command in the collision avoidance mode.

The inputter 230 may also receive an on—off command of an operation mode associated with the collision avoidance mode. For example, the operation mode associated with the collision avoidance mode may include an autonomous driving mode.

The inputter 230 may receive a warning sound for preventing collision among a plurality of warning sounds.

The second controller 240 may perform image processing to recognize a lane line of the road when image information of a road is received, recognize the subject lane on which the host vehicle travels based on the recognized position information of the lane line, determine whether both lanes of the subject lane are recognized and control autonomous driving based on the recognized both lanes when both lanes are determined to be recognized.

The second controller 240 may warn the driver of the collision, transmit a braking signal to the braking system 32, or transmit a steering signal to the steering system 42 based on the obstacle information detected by the obstacle detector 220. Here, the obstacle information may include information about the existence of the obstacle and the position information of the obstacle, and the position information of the obstacle may include a distance value and the direction of the obstacle.

The distance to the obstacle may be a relative distance between the host vehicle and the obstacle, and the direction of the obstacle may be a relative direction with respect to the host vehicle.

The second controller 240 may control the display 260 to display the position information of the obstacle as the top view image.

Upon receiving the position information of the obstacle, the second controller 240 may acquire the velocity information of the obstacle based on a variation of the received position information of the obstacle.

That is, the second controller 240 may periodically receive position information of the obstacle detected by the obstacle detector, periodically acquire a distance value of the obstacle from the received position information of the obstacle, acquire a variation of the distance value over time from the periodically acquired distance values of the obstacle, and acquire velocity information corresponding to the moving velocity of the obstacle from the variation of the distance value.

The second controller 240 may also acquire the acceleration information of the obstacle based on the velocity information of the obstacle.

The second controller 240 may determine whether the obstacle exists in at least one of a center direction and a left and right direction of the host vehicle based on the obstacle information, acquire a distance value and a direction from the obstacle when it is determined that an obstacle exists in at least one of the center direction and the left and right directions, acquire the velocity of the obstacle based on the identified distance from the obstacle, acquire acceleration of the obstacle based on the velocity of the obstacle, generate at least one of a braking signal and a steering signal based on distance, direction, velocity, and acceleration from the obstacle and transmit the generated at least one signal to at least one of braking system 32 and steering system 42.

The obstacle may be a pedestrian, a bicycle, a bike, another vehicle, a curb or a guardrail, or a street lamp or a roadside tree.

The second controller 240 may firstly control braking and steering of the vehicle to prevent collision with the obstacle based on the obstacle information detected by the front radar, and, when controlling the braking and steering of the vehicle in order to prevent collision with obstacles, control braking and steering of the vehicle secondly to prevent secondary collision based on the obstacle information detected by the corner radar to prevent collision with the obstacle.

In addition, the second controller 240 may control only the braking and steering of the vehicle firstly to prevent collision with the obstacle based on the obstacle information detected by the front radar and the corner radar.

The second controller 240 periodically acquires the traveling velocity of the host vehicle based on velocity information detected by the velocity detector 270, and controls acceleration and deceleration such that the acquired traveling velocity is kept at a predetermined traveling velocity.

When the velocity detector is provided using an acceleration sensor, the second controller 240 may acquire acceleration of the host vehicle based on information detected by the acceleration sensor, and acquire the traveling velocity of the host vehicle based on the acquired acceleration.

When the velocity detector is provided using an acceleration sensor and a plurality of wheel velocity sensors, the second controller 240 may acquire the acceleration of the host vehicle based on information detected by the acceleration sensor, and may acquire the travelling velocity of the host vehicle based on velocity information acquired by the plurality of wheel velocity sensors.

The second controller 240 predicts the collision position with the obstacle based on the acquired host vehicle velocity, host vehicle acceleration, and obstacle velocity and obstacle acceleration.

That is, the second controller 240 may acquire a movement distance value and a direction of the host vehicle based on the acquired velocity of the host vehicle and acceleration of the host vehicle, acquire a movement distance value and a direction of the obstacle based on the acquired velocity of the obstacle and acceleration of the obstacle and predict a collision position based on the acquired movement distance value and direction of the host vehicle and the movement distance value and direction of the obstacle.

The second controller 240 may predict a collision position with an obstacle, acquire a distance value to a collision position based on the current position information of the host vehicle and the collision position with the obstacle, acquire a distance value of the host vehicle to move in the lateral direction based on the acquired distance value to the collision position and the rotation radius of the host vehicle, acquire a steering angular velocity based on the acquired distance value and the collision avoidance margin distance value, acquire a steering angle based on the acquired steering angular velocity and generate a steering signal of the host vehicle based on the acquired steering angle.

Here, the collision avoidance margin distance value may be a value acquired by adding a reference additional distance value and a value corresponding to position information of the collision point.

The second controller 240 may acquire at least one target point that may collide with the host vehicle among the points of the obstacle based on obstacle information detected by the front radar and the lateral angle resolution of the front radar, acquire a distance value between a plurality of preset collision points and at least one target point, identify a collision point having a distance value of zero first among the acquired distance values and acquire a collision avoidance margin distance value corresponding to the identified collision point.

When the identified collision point is a reference collision point, the collision avoidance margin distance value may be a reference additional distance value.

when the identified collision point is not the reference collision point, the collision avoidance margin distance value may be a value acquired by adding the distance value between the identified collision point and the reference collision point to the reference additional distance value.

The distance between the reference additional distance value and the collision point may be a value stored in the storage 241.

The obstacle is an obstacle located in front of the host vehicle and is an obstacle that exists in front of the host vehicle based on the front bumper of the host vehicle.

In addition, when there are a plurality of target points, the second controller 240 may acquire a distance value between the plurality of collision points and the plurality of target points, identify a collision point and a target point having a distance value of zero first among the acquired distance values, acquire a collision avoidance margin distance value corresponding to the identified collision point among information about the additional distance value for each collision point stored in the storage 241.

In this case, the second controller 240 may acquire a distance value to which the host vehicle moves in the lateral direction based on the distance to the collision position to which the identified collision point and target point will collide and the rotation radius of the host vehicle.

When acquiring at least one target point, the second controller 240 may acquire at least one target point that may collide with the host vehicle among the points of the obstacle based on the image information acquired by the front camera.

In addition, the second controller 240 may, when acquiring velocity and acceleration of the obstacle, periodically acquire a distance value from at least one target point, acquire a velocity of at least one target point based on a change in distance value with the at least one target point acquired periodically and acquire acceleration of at least one target point acquired.

In addition, when the second controller 240 acquires a distance value with the obstacle, the second controller 240 may acquire the distance value with the obstacle for each collision point based on position information of each of a plurality of preset collision points, traveling velocity and acceleration information of the vehicle.

The second controller 240 may identify a reception channel of the front radar in which obstacle information is received among the reception channels of the front radar, identify a collision point corresponding to the identified reception channel, and acquire a distance value and a direction between the identified collision point and the obstacle.

When the collision point corresponding to the reception channel of the front radar and the collision point corresponding to the reception channel of the corner radar are equal to each other, the second controller 240 may acquire a distance value and a direction between the collision point and the obstacle based on a signal received in one or both reception channels of the reception channel of the front radar and the reception channel of the corner radar.

The second controller 240 may acquire a distance value between the plurality of collision points and the at least one target point, identify a collision point having a distance value of zero first among the acquired distance values and, when it is determined that the identified collision point is the central collision point of the host vehicle, control emergency braking.

The second controller 240 may identify the direction in which the obstacle moves when it is determined that the identified collision point is the central collision point of the host vehicle, and control steering in the same direction as the movement direction of the identified obstacle.

The second controller 240 may, when it is determined that the identified collision point is the central collision point of the host vehicle, identify the traveling velocity of the host vehicle, only control braking when the identified traveling velocity is less than or equal to the reference velocity, identify the movement direction of the obstacle when the identified traveling velocity exceeds the reference velocity and control steering in the same direction as the movement direction of the identified obstacle.

The second controller 240 may, when it is determined that the identified collision point is a collision point located on the left side of the host vehicle based on the central collision point, control the right steering, when it is determined that the identified collision point is a collision point located on the right side of the host vehicle based on the central collision point, control the left steering.

The second controller 240 may also control braking together when the identified collision point is not the central collision point.

The second controller 240 of the collision avoidance device may communicate with the braking system 32 and the steering system 42. In this case, the second controller 240 may transmit the position information of the obstacle to the braking system and the steering system.

The braking system 32 may perform braking in response to a braking signal of the second controller 240 when preventing a collision with an obstacle.

The braking system 32 may also perform emergency braking based on a braking signal of the second controller 240.

The steering system 42 may perform steering in response to a steering signal of the second controller 240 when preventing a collision with an obstacle.

The storage 241 may store identification information and position information of a plurality of collision points corresponding to the lateral angle resolution of the front radar. In this case, the lateral angle resolution is an ability to separate and recognize a detection area capable of detecting an obstacle using a front radar, and the detection area may be recognized by separating a preset angle by a reference unit.

The storage 241 may store steering information corresponding to the plurality of collision points.

The storage 241 may store a reference additional distance value corresponding to the reference collision point, and store a distance value between the reference collision point and the remaining collision points.

The storage 241 may also store collision avoidance margin distance values for a plurality of collision points.

The storage 241 may store a reference velocity, store a rotation radius of the host vehicle, and store a length value between the front wheel and the rear wheel of the host vehicle.

The storage 241 may include a nonvolatile memory device, such as a cache, a read only memory (ROM), a programmable ROM (PROM), an erasable programmable ROM (EPROM), an electrically erasable programmable ROM (EEPROM), and a flash memory, a volatile memory device, such as a random access memory (RAM), or other storage media, such as a hard disk drive (HDD), a CD—ROM, and the like., but the implementation of the storage 241 is not limited thereto.

The storage 241 may be a memory implemented as a chip separated from the processor, which will be described below in connection with the second controller 240, or may be implemented as a single chip integrated with the processor.

The sound outputter 250 outputs sound in response to a control command of the second controller 240.

The sound outputter 250 outputs a warning sound for preventing collision with an obstacle. The sound outputter 250 may be a speaker.

The display 260 may display an image or turn on or turn off a light in response to a control command of the second controller 240.

The display 260 may display performance information and non-performance information of the collision avoidance mode, and may display information on collision avoidance when the collision avoidance mode is being performed.

The display 260 may display braking command information, steering angle information, and steering command information.

The display 260 may be a lamp, such as an LED lamp, or a flat panel display, such as an LCD.

The display 260 may display on/off information of an operation mode associated with the collision avoidance mode. In this case, the display 260 may display performance information of the collision avoidance mode and performance information of the operation mode associated with the collision avoidance mode together.

The display 260 may display an autonomous driving mode or a manual driving mode.

The display 260 may display an obstacle acquired by the image acquirer 210 in addition to the lane line.

The display 260 may display a top view image of the vehicle.

The velocity detector 270 detects a traveling velocity of the vehicle.

The velocity detector 270 may include a plurality of wheel velocity sensors provided on a plurality of wheels, respectively, to detect wheel velocities of the plurality of wheels.

The velocity detector 270 may also include an acceleration sensor for detecting an acceleration of the vehicle.

The velocity detector 270 may include the plurality of wheel velocity sensors together with the acceleration sensor.

Figure 6A:
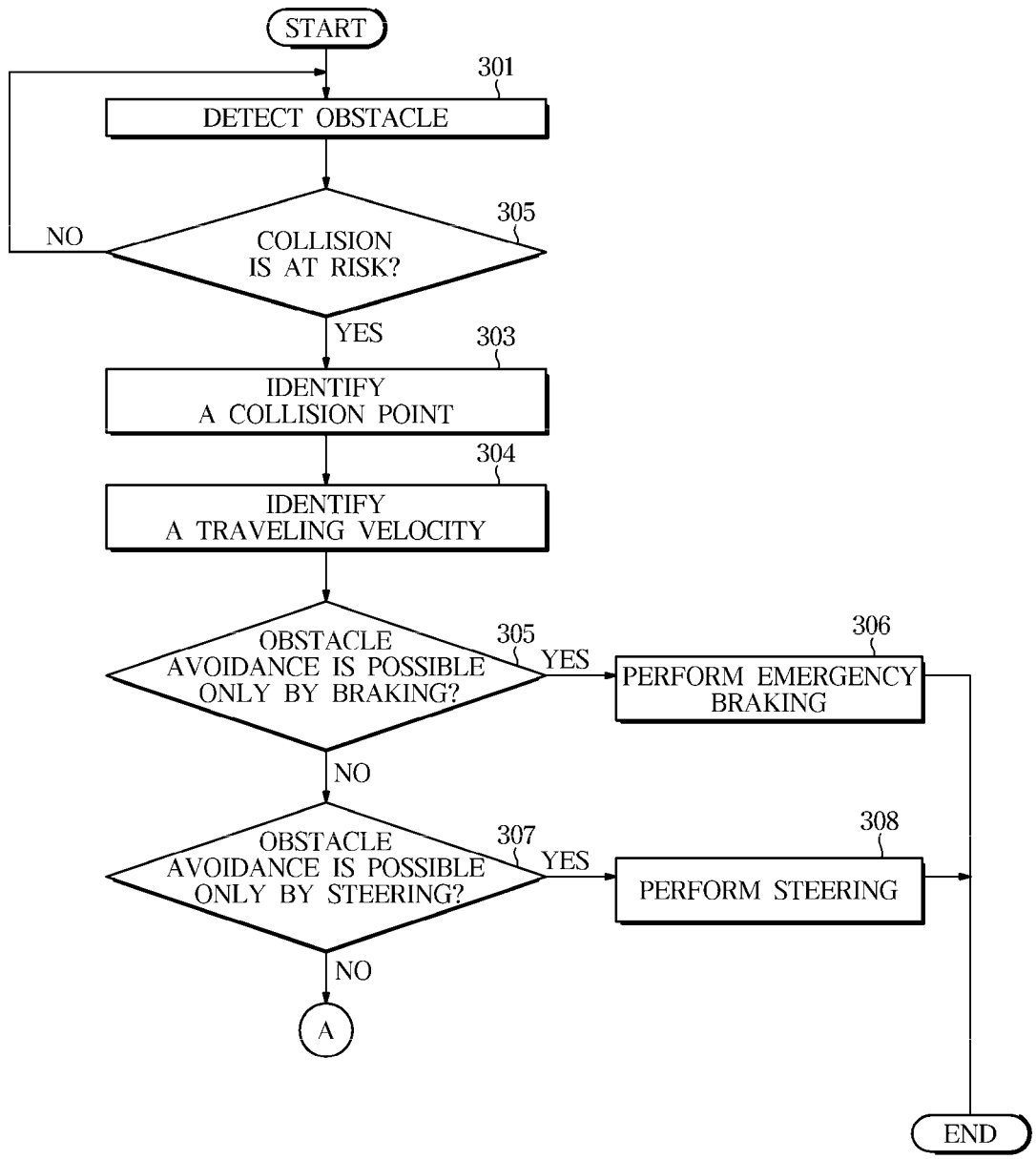
FIGS. 6A and 6B are a flowchart illustrating a control method of a vehicle according to an embodiment
Figure 6B:
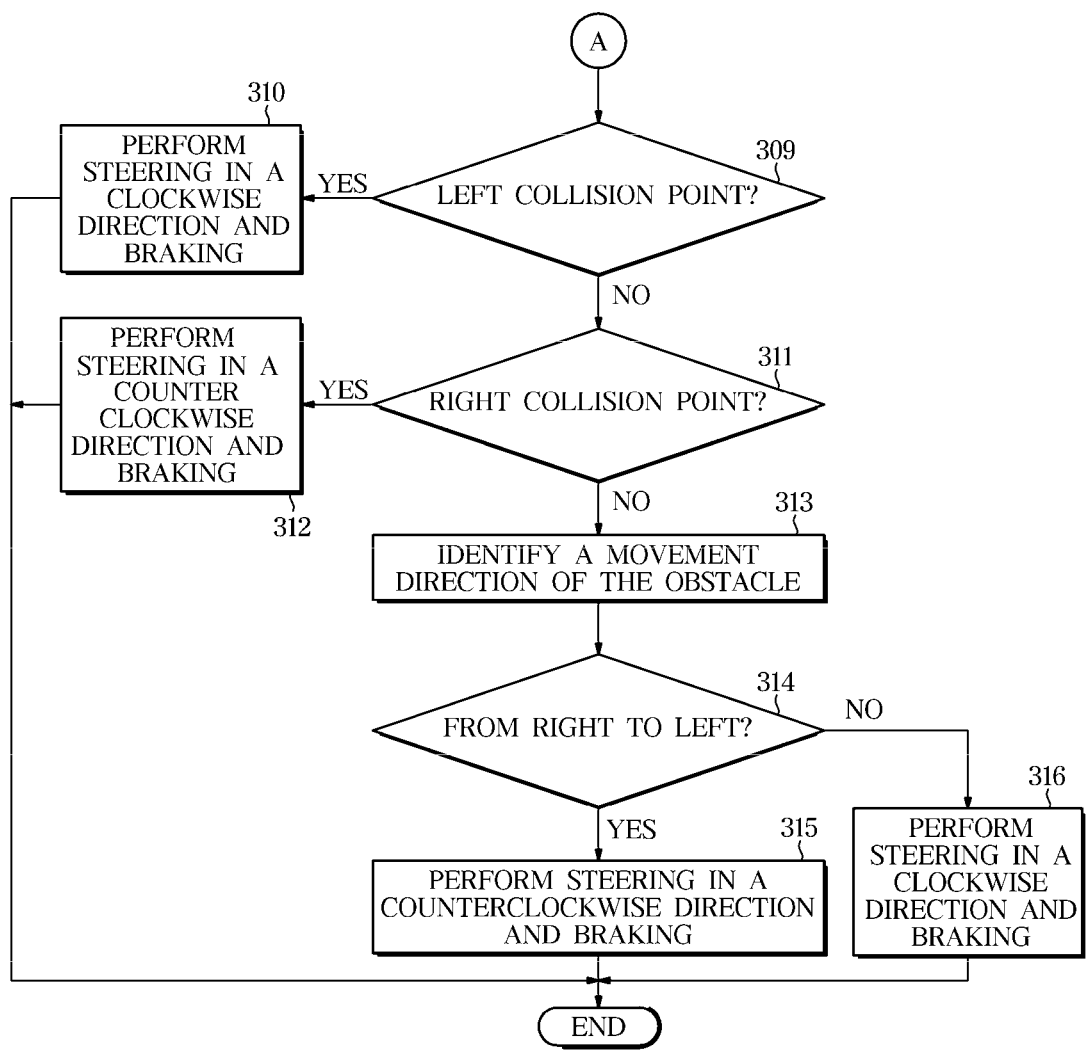

FIGS. 6A and 6B are a flowchart illustrating a control method of a vehicle according to an embodiment, which will be described with reference to FIGS. 7A, 7B, 7C, 8, and 9.

If it is assumed that the front radar is used as an obstacle detector for detecting obstacle information for controlling the braking system and the steering system when preventing collision with obstacles, and that the first and second corner radars are used as obstacle detectors to detect obstacle information for preventing additional collision with obstacles, the control operation of the vehicle will be described.

When the driving mode is the autonomous driving mode, the vehicle acquires an image of the road by activating the image acquirer 210, recognizes a lane line of the road within the image by image processing the acquired road image and recognizes a subject lane based on the location of the recognized lane line.

In addition, the vehicle may recognize an obstacle in the image through the image processing, and may acquire position information of the recognized obstacle based on the image.

Here, the obstacle refers to an obstacle that exists at a position in front of the host vehicle with respect to the front bumper of the host vehicle. For example, the obstacle may be at least one of a pedestrian, a bicycle, a bike, another vehicle, a curb, a guardrail, a street lamp, or a roadside tree.

The vehicle controls the autonomous driving while recognizing the subject lane on which the host vehicle is travelling and obstacles.

The vehicle may detect the surrounding obstacles using the obstacle detector 220 while photographing the road image (301), acquire position information of the detected obstacle based on the detection information detected by the obstacle detector 220.

In detail, the vehicle may acquire position information (distance and direction) and velocity information (relative velocity) of the obstacles in front of the vehicle 1 based on the front radar data of the front radar 120 of the obstacle detector 220.

The front radar data of the front radar 120 is data corresponding to the lateral angle resolution, and may be a detection signal of an obstacle received through at least one of the plurality of reception channels.

That is, the vehicle may acquire the distance value with respect to the obstacle and the direction of the obstacle based on the front radar data received through at least one of the plurality of reception channels. Here, the obstacle direction may be left, center, and right of the front of the vehicle with respect to the center point of the host vehicle.

Also, the vehicle may acquire velocity information and acceleration information to which the obstacle moves based on a change in the distance value with the obstacle corresponding to the time change.

In addition, when the vehicle acquires the velocity information of the obstacle, the vehicle may acquire the relative velocity of the obstacle based on the traveling velocity of the host vehicle.

The vehicle may acquire position information (direction) and type information (for example, whether the obstacle is another vehicle, a pedestrian, a cyclist, a cub, a guard rail, a roadside tree, a street lamp, or the like) of the obstacle existing in front of the vehicle 1 based on the front image data of the front camera 110.

In addition, the vehicle may match the obstacles detected by the front image data with the obstacles detected by the front radar data, and acquire the type information, the position information, and the velocity information of the obstacles in front of the vehicle 1 based on a result of the matching.

In addition, the vehicle may acquire position information (distance and direction) and velocity information (relative velocity) of obstacles on the side of the vehicle 1 (front right, front left, rear right, and rear left) based on the corner radar data of the plurality of corner radars 130.

The corner radar data of the plurality of corner radars 130 is data corresponding to the lateral angle resolution and may be a detection signal of an obstacle received through at least one of the plurality of reception channels.

The vehicle may acquire position information (distance and direction) and velocity information (relative velocity) of obstacles around the vehicle 1 based on at least one of the front image data of the front camera 110, the corner radar data of the plurality of corner radars 130 and the front radar data of the front radar 120.

The vehicle calculates a time to collision (TTC) between the vehicle 1 and the front obstacle based on the position information (relative distance) and the velocity information (relative velocity) of the front objects, and determines whether the collision is at risk based on a result of comparing the TTC with a predetermined reference time (302).

The vehicle may warn the driver of a collision when it is determined that a collision risk exists. That is, in response to the time until the collision smaller than the predetermined reference time, the vehicle may be configured to output a warning through at least one of a sound and a display.

As another example, the vehicle may calculate a distance to collision (DTC) based on the velocity information (relative velocity) of front objects, and determine whether the collision is at risk based on a result of comparing the DTC with distances to the front objects.

The vehicle may display the position information of the obstacle as the top view image through the display 260. The position information of the obstacle may include a distance value from the obstacle and the direction of the obstacle. The distance from the obstacle may be a relative distance between the host vehicle and the obstacle, and the direction of the obstacle may be relative to the host vehicle.

The vehicle may perform at least one of braking and steering of the vehicle based on whether the collision with the obstacle is in danger. This is explained in more detail.

The vehicle may acquire at least one target point that may collide with the host vehicle among the points of the obstacle based on obstacle information detected by the front radar 120 and the lateral angle resolution of the front radar, When the vehicle acquires at least one target point, the vehicle may acquire at least one target point that may collide with the host vehicle among the points of the obstacle based on the image information acquired by the front camera.

Figure 7A:
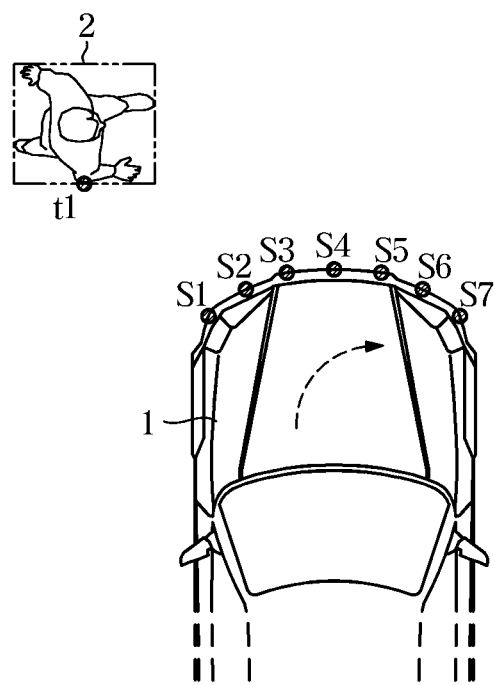
FIGS. 7A, 7B, and 7C are exemplary views of acquiring a target point of an obstacle in a vehicle according to an embodiment.

As shown in FIG. 7A, when the obstacle 2 is a pedestrian, the vehicle may acquire a point (eg, a shoulder) that may collide with the host vehicle in the pedestrian's body as the target point t1.

Figure 7B:
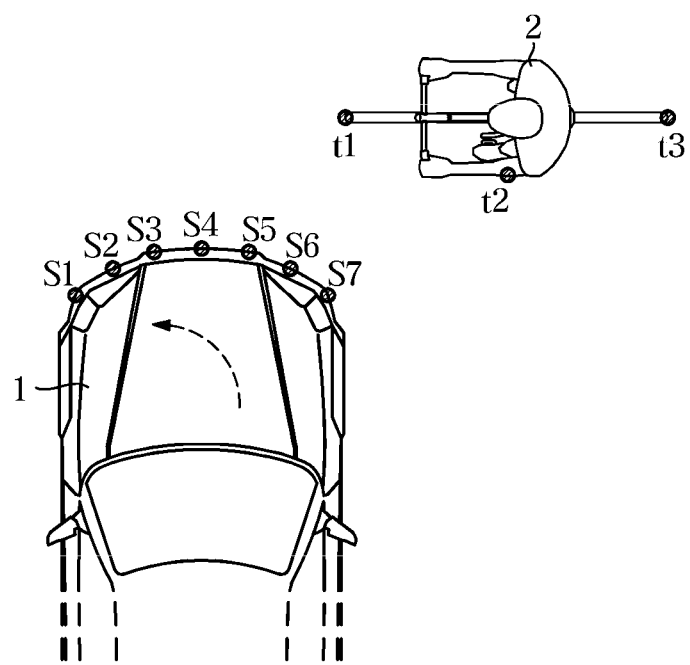

As shown in FIG. 7B, when the obstacle 2 is a cyclist, the vehicle may acquire a point (eg, the wheel of the bicycle and the arm of the person) that may collide with the host vehicle among the bicycle and the human body as a target point t1, t2, t3.

Figure 7C:
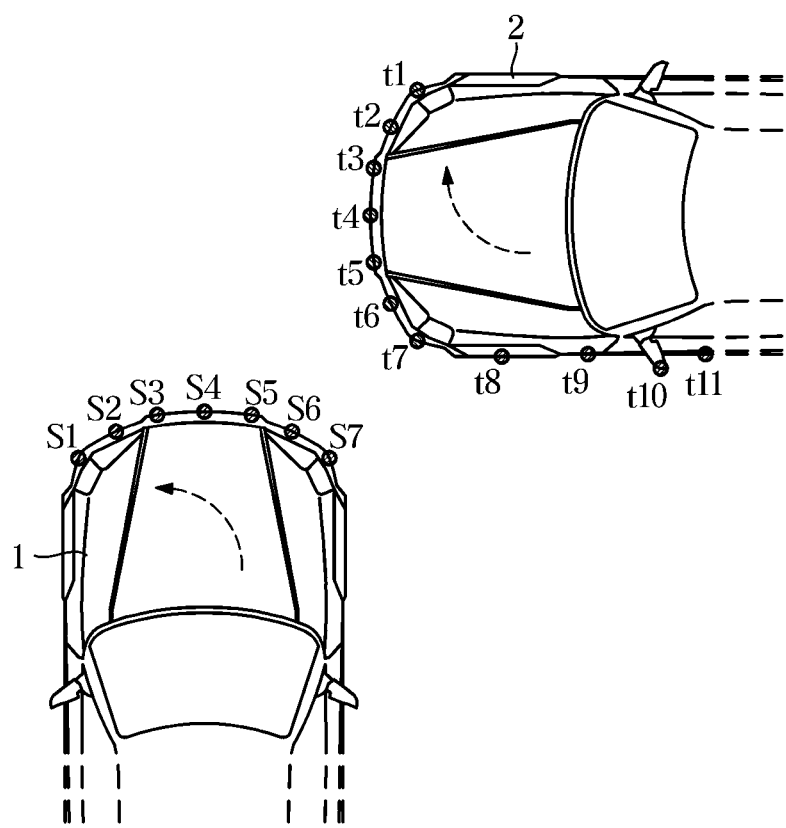

As shown in FIG. 7C, when the obstacle 2 is another vehicle, the vehicle may acquire a point (for example, the front and left sides of the another vehicle) that may collide with the host vehicle among the another vehicles as the target points t1—t11.

Here, the collision point may be a point closest to the host vehicle or may be a point that may contact with the host vehicle.

When the vehicle acquires the velocity and acceleration of the obstacle, the vehicle may periodically acquire a distance value from at least one target point, acquire a velocity of at least one target point based on a change in distance value with the at least one target point acquired periodically, acquire acceleration of at least one target point acquired.

When the vehicle periodically acquires a distance value from at least one target point, the vehicle may acquire a distance value with a target point for each collision point for each of the plurality of collision points based on the position information of the plurality of preset collision points S1—S7, identify a collision point having a distance value of zero among the acquired distance values first (303).

$S1=[As1,Vs1,Ss1] Sn=[Asn,Vsn,Ssn]$ $t1=[At1,Vt1,St1] tn=[Atn,Vtn,Stn] A$:acceleration,$V$:velocity,$S$:distance Based on the relationship between velocity and movement distance $S=(V^2-Vo^2)/2a$, By acquiring the travel distance value of the host vehicle and the travel distance value of the obstacle, a target point and a collision point at which a host vehicle and an obstacle may collide may be acquired.

Here, the plurality of preset collision points s1—s7 are points set by the lateral angle resolution of the front radar, and may be points provided in regions corresponding to the plurality of reception channels, respectively.

A portion of the region located on the right side of the host vehicle among the regions corresponding to the plurality of reception channels of the front radar may overlap with at least one region of the plurality of reception channels of the first corner radar 131.

A portion of the region located on the left side of the host vehicle among the regions corresponding to the plurality of reception channels of the front radar may overlap with at least one region of the plurality of reception channels of the second corner radar 132.

That is, the vehicle may acquire a distance value with a target point for each collision point for each of the plurality of collision points based on the radar data of the first and second corner radars 131 and 132, and identify a collision point having a distance value of zero first among the acquired distance values.

The vehicle identifies the traveling velocity of the host vehicle (304). When the velocity detector is a plurality of wheel velocity sensors, the vehicle may acquire the traveling velocity of the host vehicle based on the plurality of wheel velocity information acquired by the plurality of wheel velocity sensors.

When the velocity detector is provided using an acceleration sensor, the vehicle may acquire acceleration of the host vehicle based on information detected by the acceleration sensor, and acquire the traveling velocity of the host vehicle based on the acquired acceleration.

When the velocity detector is provided using an acceleration sensor and a plurality of wheel velocity sensors, the second controller 240 may acquire the acceleration of the host vehicle based on information detected by the acceleration sensor, and may acquire the travelling velocity of the host vehicle based on the acquired acceleration information and velocity information acquired by the plurality of wheel velocity sensors.

When the vehicle identifies the traveling velocity of the host vehicle, the vehicle may periodically acquire a traveling velocity of the host vehicle based on the velocity information detected by the velocity detector 270, and acquire acceleration of the host vehicle based on the acquired traveling velocity.

The vehicle determines (305) whether obstacle avoidance is possible only by braking based on the identified collision point and traveling velocity, and performs emergency braking (306) when it is determined that obstacle avoidance is possible by braking only.

Determining whether obstacle avoidance is possible only by braking may determine that obstacle avoidance is possible only by braking when the collision point is the central collision point S4 and the traveling velocity is less than or equal to the reference velocity.

The vehicle may determine that obstacle avoidance is impossible by braking only when the collision point is not the central collision point S4 or when the traveling velocity exceeds the reference velocity.

When it is determined that the obstacle avoidance is impossible only by braking, the vehicle determines whether it is possible to avoid obstacles only by steering (307). When it is determined that obstacle avoidance is possible only by steering, the vehicle performs steering of the vehicle (308).

Determining whether obstacle avoidance is possible by steering only may include determining whether the obstacle moves.

For example, when the vehicle determines that the obstacle is the obstacle with fixed position, the vehicle may determine that the obstacle avoidance is possible only by steering. When the vehicle determines that the obstacle is a moving obstacle, the vehicle may determine that avoiding the obstacle is impossible only by steering.

The fixed obstacle may be a traffic light, a roadside tree, a curb, a street lamp, a guard rail, or the like. The moving obstacle may be a pedestrian, a cyclist, a bike, another vehicle, an animal, or the like.

When the vehicle determines that the obstacle avoidance is impossible only by braking or steering, the vehicle determines whether the identified collision point is a left collision point located on the left side of the host vehicle (309). When it is determined that the identified collision point is the left collision point, the vehicle performs steering in a clockwise direction, and braking (310)

For example, the left collision point may be any one of S1—S3.

When the vehicle determines that the identified collision point is not the left collision point located on the left side of the host vehicle, the vehicle determines whether the identified collision point is the right collision point located on the right side of the host vehicle (311). When it is determined that the identified collision point is the right collision point, the vehicle performs steering in a counterclockwise direction and braking (312)

For example, the right collision point may be any one of S5—S7.

When steering the clockwise direction, the vehicle may acquire a steering angle, generate a steering signal based on the acquired steering angle, and control the steering based on the generated steering signal.

Here, an example of a configuration for acquiring a steering angle will be described.

The vehicle predicts the collision position with the obstacle based on the traveling velocity of the host vehicle, the acceleration of the host vehicle, the velocity of the obstacle, and the acceleration of the obstacle.

That is, the vehicle may acquire a movement distance value and a direction of the host vehicle based on the traveling velocity of the host vehicle and acceleration of the host vehicle, acquire a movement distance value and a direction of the obstacle based on the velocity of the obstacle and acceleration of the obstacle and predict a collision position based on the acquired movement distance value and direction of the host vehicle and the movement distance value and direction of the obstacle.

Figure 8:
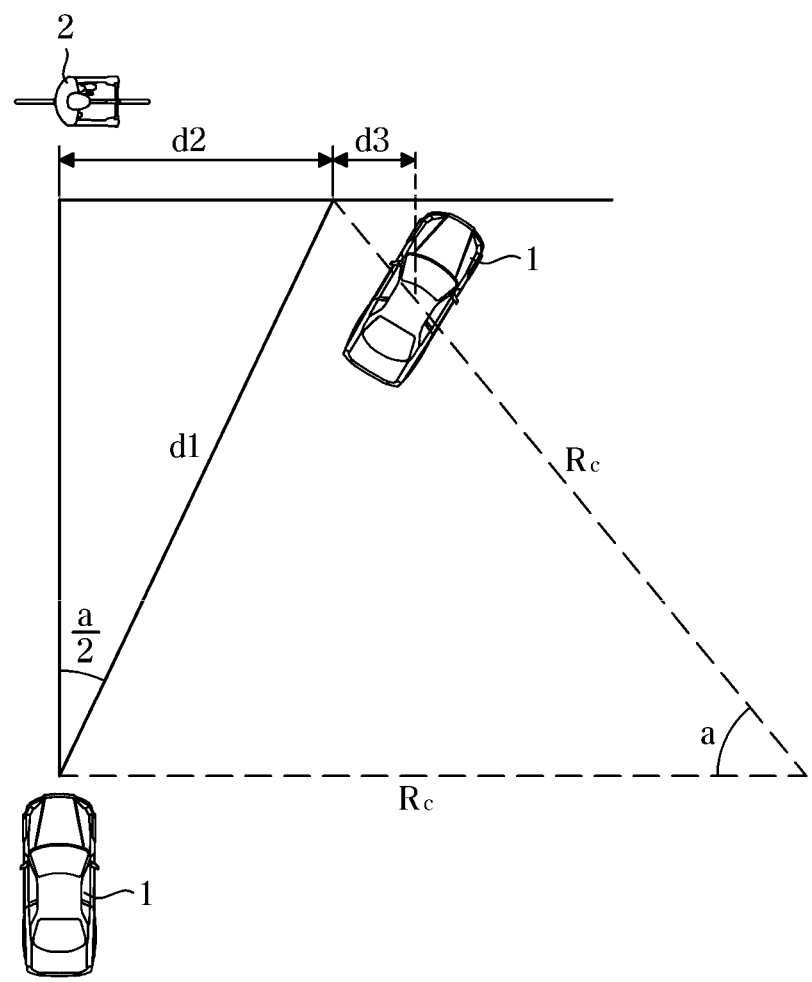
FIG. 8 is an exemplary diagram for acquiring a movement distance value in a lateral direction when avoiding a collision of a vehicle according to an embodiment.

As shown in FIG. 8, the vehicle may acquire a rotation angle α of the vehicle based on the current position of the vehicle, the predicted collision position, and the rotation radius Rc of the vehicle, acquire a distance value d1 from the current position to the predicted collision position based on the acquired rotation angle a and the rotation radius Rc, acquire a movement distance value d2 in a lateral direction to which the host vehicle should move in the lateral direction based on the distance value d1 from the current position to the predicted collision position and the rotation radius Rc.

The rotation angle (a) of the vehicle may be a degree between a line connecting the center of the rotation radius of the vehicle and the current position of the vehicle and a line connecting the center of the rotation radius of the vehicle and the predicted collision position. That is, the rotation angle (a) of the vehicle may be an angle corresponding to the movement distance (arc) of the vehicle when it moves from the current position of the vehicle to the predicted collision position based on the center of the rotation radius of the vehicle.

The distance value d1 from the current position to the predicted collision position may be the length of the chord corresponding to the arc.

The movement distance value d2 to which host vehicle should move in the lateral direction may be a distance value between the current position of the obstacle and the predicted collision position.

Here, the current position of the obstacle may be a point reached when the host vehicle travels straight.

The distance value from the current position to the predicted collision position is (d1)=2Rc* sin (a/2) and sin (a/2)=d2/d1, from this, the following equation may be acquired $$d1=2Rc*(d2/d1), d1^2=2Rc*d2$$

The movement distance value d2 to which host vehicle should move in the lateral direction is $d2=d1^2/2Rc$.

The vehicle acquires a collision avoidance margin distance value d3 corresponding to the identified collision point.

In addition, the vehicle stores position information about each of the plurality of collision points and a collision avoidance margin distance value corresponding to each of the plurality of collision points.

The collision avoidance margin distance value d3 may be a reference additional distance value and may be a value acquired by adding a distance value between the reference collision point and the identified collision point to the reference additional distance value.

The reference collision point may be collision points S1 and S7 positioned at the outermost side of the left side and the outermost side of the right side of the front bumper among the plurality of collision points (see FIGS. 7A, 7B, and 7C).

The collision avoidance margin distance values corresponding to the reference collision points S1 and S7 may be reference additional distance values dr.

The collision avoidance margin distance value corresponding to the collision point S2 may be a value (dr+da) acquired by adding a distance value (da=S2−S1) between the collision points S1 and S2 to a reference additional distance value. The collision avoidance margin distance value corresponding to the collision point S3 may be a value (dr+db) acquired by adding a distance value (db=S3−S1) between the collision points S1 and S3 to the reference additional distance value.

The collision avoidance margin distance value corresponding to the collision point S6 may be a value (dr+dc) acquired by adding a distance value (dc=S7−S6) between the collision points S7 and S6 to a reference additional distance value. The collision avoidance margin distance value corresponding to the collision point S5 may be a value (dr+dd) acquired by adding the distance value dd=S7−S5 between the collision points S7 and S5 to the reference additional distance value dr.

The distance value da between the collision points S1 and S2 may be equal to the distance value dc between the collision points S7 and S6. In addition, the distance value db between the collision points S1 and S3 may be equal to the distance value dd between the collision points S7 and S5.

The vehicle acquires the total movement distance d2+d3 based on the travel distance value d2 in lateral direction and the collision avoidance margin distance value d3, and acquires the steering angle based on the total movement distance.

That is, the vehicle may acquire a total movement distance to be moved laterally from the current position, and acquire a steering angle between the position of the target point and the current position to reach the target point corresponding to the acquired total movement distance. Here, the steering angle may be a rotation angle of the front wheel.

The vehicle may acquire a steering angular velocity based on the rotation angle of the front wheel, and may generate a steering signal of the host vehicle based on the acquired steering angular velocity.

Figure 9:
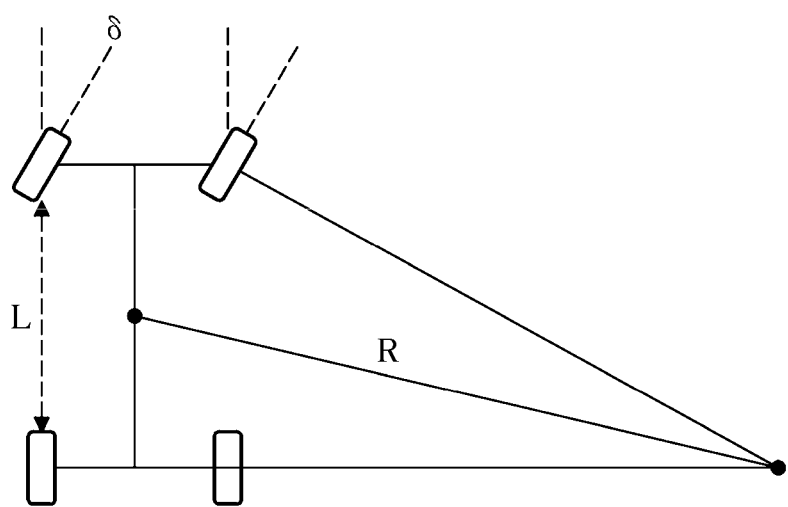
FIG. 9 is an exemplary view of acquiring a steering angular velocity when avoiding a collision of a vehicle according to an embodiment.

As shown in FIG. 9, based on Thomas D. Gillespie, Fundamentals of Vehicle Dynamics, the vehicle may acquire a steering angular velocity based on a rotation angle (δ) of the front wheels, a length (L) between the front wheels and the rear wheels, a rotation radius (R) and velocity (V).

$$R>>1, R\delta=L, V=RW=(L/\delta)W, W=(V/L)*\delta$$

When the rotation angle of the front wheel has an offset, $\delta'=\delta+\delta\delta$, $W=(V/L)*(\delta'-\delta\delta)$ $$\Delta W_k=(V_k/L)*(\delta_k'-\delta\delta)-V_{k-1}(\delta_{k-1}'-\delta\delta)$$

If $V_k \approx V_{k-1}$, $\Delta W_k = (V_k/L) * \Delta \delta_k'$

The vehicle may perform steering of the vehicle based on the acquired steering angular velocity.

When it is determined that the identified collision point is not both the left collision point and the right collision point, the vehicle determines that the identified collision point is the center collision point, and identify the movement direction of the obstacle (313).

When it is determined that the movement direction of the obstacle is from right to left (314), the vehicle performs steering in a counterclockwise direction and braking (315). When it is determined that the movement direction of the obstacle is not from right to left, that is, when it is determined that the movement direction of the obstacle is from left to right, the vehicle performs steering in a clockwise direction and braking (316).

That is, the vehicle may identify the direction in which the obstacle moves when it is determined that the identified collision point is the central collision point of the host vehicle, and control steering in the same direction as the movement direction of the identified obstacle.

In addition, the vehicle may, when it is determined that the identified collision point is the central collision point of the host vehicle, identify the traveling velocity of the host vehicle, only control braking when the identified traveling velocity is less than or equal to the reference velocity, identify the movement direction of the obstacle when the identified traveling velocity exceeds the reference velocity and control steering in the same direction as the movement direction of the identified obstacle.

In addition, the vehicle may, upon steering control, determine whether an obstacle exists in the steering direction based on the radar data of the corner radar and stop steering control when it is determined that the obstacle exists.

The vehicle may, upon steering control, determine whether the obstacle existing in the steering direction is an obstacle corresponding to a fixed object based on the change in the radar data of the corner radar.

In addition, the vehicle may, upon steering control, determine whether an obstacle existing in the steering direction is an obstacle corresponding to a fixed object based on the image information acquired by the front camera and the vehicle may prevent human accidents by controlling the steering based on the acquired steering angular velocity when it is determined that the obstacle corresponds to the fixed object.

The present invention can prevent collision with the obstacle by automatically performing at least one of steering control and braking control on behalf of the driver before the collision with the obstacle and further reduce the incidence of injuries, and can improve the stability of the driving.

The present invention can help collision avoidance for other vehicles, pedestrians, bicycles and motorcycles coming from the side of the vehicle using the front radar, the corner radar and the camera.

In particular, the present invention can easily grasp the movement to the surrounding obstacles when the novice driver is driving or at night driving, thereby easily avoiding the collision with the obstacles.

As described above, the present invention can improve usability, quality, and commerciality of the collision avoidance device and the vehicle, and further increase the user's satisfaction and secure the competitiveness of the product.

Meanwhile, the disclosed embodiments may be embodied in the form of a recording medium storing instructions executable by a computer. The instructions may be stored in the form of program code and, when executed by a processor, may generate a program module to perform the operations of the disclosed embodiments. The recording medium may be embodied as a computer-readable recording medium.

The computer-readable recording medium includes all kinds of recording media in which instructions which can be decoded by a computer are stored, for example, a Read Only Memory (ROM), a Random Access Memory (RAM), a magnetic tape, a magnetic disk, a flash memory, an optical data storage device, and the like.

Although a few embodiments of the present disclosure have been shown and described, it would be appreciated by those skilled in the art that changes may be made in these embodiments without departing from the principles and spirit of the invention, the scope of which is defined in the claims and their equivalents.

What is claimed is:

1. A collision avoidance device comprising:
   an obstacle detector configured to detect an obstacle;
   a velocity detector configured to detect a traveling velocity of the vehicle; and
   a controller configured to acquire position information of the obstacle based on obstacle information detected by the obstacle detector, identify a collision point on a vehicle that may collide with the obstacle based on the acquired position information of the obstacle, generate a control signal, including at least one of a steering signal and an emergency braking signal, for controlling at least one of steering and braking based on position information of the identified collision point on the vehicle and transmit the generated control signal to at least one of a steering system and a braking system,
   wherein the controller is configured to generate the steering signal in a clockwise direction as a first steering signal in response to a determination that the collision point on the vehicle that may collide with the obstacle is on a left side of the vehicle, and generate the steering signal in a counterclockwise direction as a second steering signal in response to a determination that the collision point on the vehicle that may collide with the obstacle is on a right side of the vehicle, and
   the controller is further configured to identify the traveling velocity in response to a determination that the collision point on the vehicle that may collide with the obstacle is a front center point on the vehicle, generate the emergency braking signal in response to a determination that the identified traveling velocity is less than or equal to a reference velocity and generate the steering signal in the same direction as a movement direction of the obstacle in response to a determination that the identified traveling velocity exceeds the reference velocity.

2. The collision avoidance device of claim 1, wherein the controller is configured to predict a collision position on a road, acquire a first distance value between the predicted collision position on the road and a current position of the vehicle on the road, acquire a movement distance value in a lateral direction of the vehicle based on the first distance value and a preset turning radius of the vehicle, acquire a steering angle based on the acquired movement distance value in the lateral direction and generate the steering signal based on the acquired steering angle.

3. The collision avoidance device of claim 2, wherein the controller is configured to acquire a collision avoidance margin distance value based on a second distance value between the identified collision point on the vehicle and a reference collision point on the vehicle and acquire the steering angle based on the acquired collision avoidance margin distance value and the acquired movement distance value in the lateral direction.

4. The collision avoidance device of claim 2, further comprising:
a storage configured to store a plurality of preset collision avoidance margin distance values respectively corresponding to a plurality of preset collision points on the vehicle,
wherein the controller is further configured to identify a collision avoidance margin distance value corresponding to the identified collision point on the vehicle, acquire a total movement distance value in the lateral direction based on the identified collision avoidance margin distance value and the acquired movement distance value in the lateral direction and acquire the steering angle based on the acquired total movement distance value.

5. The collision avoidance device of claim 1, wherein
the obstacle detector comprises a radar having an angular resolution in a lateral direction of the vehicle,
wherein the controller is configured to acquire a direction and a distance value of the obstacle as the position information of the obstacle based on radar data received through at least one of a plurality of reception channels corresponding to the angular resolution in the lateral direction.

6. The collision avoidance device of claim 5, further comprising:
wherein the controller is further configured to acquire a velocity of the obstacle, an acceleration of the obstacle and a distance which the obstacle will move based on a change of the distance value from the obstacle according to a change of time, acquire an acceleration of the vehicle, and a distance which the vehicle will move based on information detected by the velocity detector, predict the collision position on the road based on the traveling velocity of the vehicle, the acceleration of the vehicle and the distance which the vehicle will move, and the velocity of the obstacle, the acceleration of the obstacle and the distance which the obstacle will move.

7. A vehicle comprising:
an obstacle detector configured to detect an obstacle;
a velocity detector configured to detect a traveling velocity of the vehicle;
a collision avoidance device configured to acquire position information of the obstacle based on obstacle information detected by the obstacle detector, identify a collision point on the vehicle that may collide with the obstacle based on the acquired position information of the obstacle, generate a control signal for controlling at least one of steering and braking based on the position information of the identified collision point on the vehicle;
a steering system configured to perform the steering based on a steering signal generated by the collision avoidance device; and
a braking system configured to perform braking based on a braking signal generated by the collision avoidance device,
wherein the collision avoidance device is configured to generate the steering signal in a clockwise direction as a first steering signal in response to a determination that the collision point on the vehicle that may collide with the obstacle is on a left side of the vehicle, and generate the steering signal in a counterclockwise direction as a second steering signal in response to a determination that the collision point on the vehicle that may collide with the obstacle is on a right side of the vehicle, and
the collision avoidance device is configured to identify the traveling velocity in response to a determination that the collision point on the vehicle that may collide with the obstacle is a front center point on the vehicle, generate an emergency braking signal in response to a determination that the identified traveling velocity is less than or equal to a reference velocity and generate the steering signal in the same direction as a movement direction of the obstacle in response to a determination that the identified traveling velocity exceeds the reference velocity.

8. The vehicle of claim 7, further comprising:
wherein the collision avoidance device is configured to predict a collision position on a road based on the position information of the obstacle and information detected by the velocity detector, acquire a first distance value between the predicted collision position on the road and a current position of the vehicle on the road, acquire a movement distance value in a lateral direction of the vehicle based on the acquired first distance value and a preset turning radius of the vehicle, acquire a steering angle based on the acquired movement distance value in the lateral direction and generate the steering signal based on the acquired steering angle.

9. The vehicle of claim 8, wherein the collision avoidance device is configured to acquire a collision avoidance margin distance value based on a second distance value between the identified collision point on the vehicle and a reference collision point on the vehicle and acquire the steering angle by adding the acquired collision avoidance margin distance value to the acquired movement distance value in the lateral direction when acquiring the steering angle.

10. The vehicle of claim 8, further comprising:
a storage configured to store a plurality of preset collision avoidance margin distance values respectively corresponding to a plurality of preset collision points on the vehicle,
wherein the collision avoidance device is configured to identify a collision avoidance margin distance value corresponding to the identified collision point on the vehicle and acquire the steering angle by adding the acquired collision avoidance margin distance value to the acquired movement distance value in the lateral direction when acquiring the steering angle.

11. The vehicle of claim 8, further comprising:
a storage configured to store a reference additional distance value corresponding to a reference collision point among a plurality of preset collision points on the vehicle and a third distance value between a remaining collision point among the plurality of preset collision points on the vehicle and the reference collision point,
wherein the collision avoidance device is configured to acquire the reference additional distance value as a collision avoidance margin distance value in response to a determination that the identified collision point on the vehicle is the reference collision point on the vehicle, identify a fourth distance value between the identified collision point on the vehicle and the reference collision point on the vehicle in response to a determination that the identified collision point on the vehicle is not the reference collision point on the vehicle, acquire a sum of the identified fourth distance value and the reference additional distance value as the collision avoidance margin distance value and acquire the steering angle by adding the acquired collision avoidance margin distance value to the acquired movement distance value in the lateral direction when acquiring the steering angle.

12. The vehicle of claim 7, wherein the obstacle detector comprises a radar having an angular resolution in a lateral direction of the vehicle,
wherein the collision avoidance device is configured to acquire a direction and a distance value of the obstacle as position information of the obstacle based on radar data received through at least one of a plurality of reception channels corresponding to the angular resolution in the lateral direction.

13. The vehicle of claim 7, further comprising:
a camera;
wherein the collision avoidance device is configured to acquire a target point of the obstacle based on image information of the camera and identify the collision point on the vehicle that may collide with the acquired target point when identifying the collision point on the vehicle that may collide with the obstacle.

14. A method of controlling a vehicle, comprising:
acquiring a direction and a distance value of an obstacle as position information of the obstacle based on radar data received through at least one of a plurality of reception channels corresponding to an angular resolution in a lateral direction of the vehicle;
identifying a collision point on the vehicle that may collide with the obstacle based on the acquired position information of the obstacle;
controlling at least one of steering and braking based on the position information of the identified collision point on the vehicle; and
when controlling the steering, acquiring a collision avoidance margin distance value corresponding to the position information of the identified collision point on the vehicle, predicting a collision position on a road based on the position information of the obstacle and information detected by a velocity detector, acquiring a first distance value between the predicted collision position on the road and a current position of the vehicle on the road, acquiring a movement distance value in the lateral direction based on the acquired first distance value and a preset turning radius of the vehicle, acquiring a steering angle based on the acquired movement distance value in the lateral direction and the acquired collision avoidance margin distance value and controlling steering based on the acquired steering angle,
wherein the controlling at least one of steering and braking comprises:
controlling the steering in a clockwise direction in response to a determination that the collision point on the vehicle that may collide with the obstacle is on a left side of the vehicle;
controlling the steering in a counterclockwise direction in response to a determination that the collision point on the vehicle that may collide with the obstacle is on a right side of the vehicle, and
the method further comprises:
identifying a traveling velocity in response to a determination that the identified collision point on the vehicle is a front center point on the vehicle; and
controlling an emergency braking in response to a determination that the identified traveling velocity is less than or equal to a reference velocity and controlling the steering in the same direction as a movement direction of the obstacle in response to a determination that the identified traveling velocity exceeds the reference velocity.

15. The method of claim 14, wherein the acquiring the collision avoidance margin distance value corresponding to the position information of the identified collision point on the vehicle comprises:
acquiring a reference additional distance value as the collision avoidance margin distance value in response to a determination that the identified collision point on the vehicle is a reference collision point on the vehicle;
identifying a second distance value between the identified collision point on the vehicle and the reference collision point on the vehicle in response to a determination that the identified collision point on the vehicle is not the reference collision point on the vehicle; and
acquiring a sum of the identified second distance value and the reference additional distance value as the collision avoidance margin distance value.

* * * * *